(12) United States Patent
Bovington et al.

(10) Patent No.: US 12,487,395 B2
(45) Date of Patent: Dec. 2, 2025

(54) NON-RESONANT GRATING BASED MULTI-MODE MULTI-PASS TUNABLE WAVEGUIDE

(71) Applicant: Cisco Technology, Inc., San Jose, CA (US)

(72) Inventors: Jock T. Bovington, Koenigstein im Taunus (DE); Donald J. Adams, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 18/186,875

(22) Filed: Mar. 20, 2023

(65) Prior Publication Data

US 2024/0411082 A1 Dec. 12, 2024

(51) Int. Cl.
*G02B 6/02* (2006.01)

(52) U.S. Cl.
CPC ............... *G02B 6/02076* (2013.01)

(58) Field of Classification Search
CPC ............................................... G02B 6/02076
See application file for complete search history.

(56) References Cited

U.S. PATENT DOCUMENTS

| | | | |
|---|---|---|---|
| 6,038,359 A | 3/2000 | Moslehi et al. | |
| 11,467,420 B2 | 10/2022 | Ling et al. | |
| 2019/0079246 A1* | 3/2019 | Shi | G02B 6/124 |
| 2021/0109281 A1 | 4/2021 | Ling et al. | |
| 2021/0286190 A1* | 9/2021 | Ling | H04J 14/0305 |

OTHER PUBLICATIONS

Steven A. Miller et al., "Large-scale optical phased array using a low-power multi-pass silicon photonic platform," Optica 7, 3-6 (2020).
Xin Shi et al., "Tunable Filters Based on Cascaded Long-Period Polymer Waveguide Gratings," Researchgate.net, Dated: Dec. 2022, pp. 1-6.

* cited by examiner

*Primary Examiner* — Sung H Pak
(74) *Attorney, Agent, or Firm* — Patterson + Sheridan, LLP

(57) ABSTRACT

Embodiments herein describe an electro-optic waveguide having a multi-mode multi-pass phase shifter (MMPS) tuner, one or more two-mode Bragg gratings, and one or more selective evanescent couplers. An input signal having a fundamental mode is reflected by the one or more Bragg gratings and tuned by the MMPS tuner. In this manner, the electro-optic waveguide isolates the higher order modes of the input signal. The one or more selective evanescent couplers capture an output signal having the highest order mode and reduces the mode of the output signal to the fundamental mode.

20 Claims, 8 Drawing Sheets

NON-RESONANT GRATING BASED MULTI-MODE MULTI-PASS TUNABLE WAVEGUIDE

TECHNICAL FIELD

Embodiments presented in this disclosure generally relate to phase tuning in photonic circuits.

BACKGROUND

Two-mode waveguides are devices designed to carry electro-optical signals. The shape, design, and geometry of a waveguide is directly tied to the frequency and wavelength of the signal the waveguide is intended to carry. For signals carried by a waveguide, phase tuning efficiency is a critical metric for modulation, filter tuning, and phase control in photonic circuits.

A section of a multimode waveguide, which is tuned by a common signal, modifies the accumulated optical properties of a waveguide. The modified properties may include refractive index, phase, loss, or gain. Tuning can occur by the application of electrical, thermal, or optical signals external to the waveguide.

In this manner the single signal can be imparted on a shared waveguide such that the result of that signals influence is multiplied by the increased interaction of multiple passes through the same waveguide without the strong wavelength effects of a resonant cavity.

Application examples include phase modulation (low and high speed), optical amplification or attenuation, enhancement of stress optic or non-linear effects (devices include: modulators, phase tuners, amplifiers, etc.).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
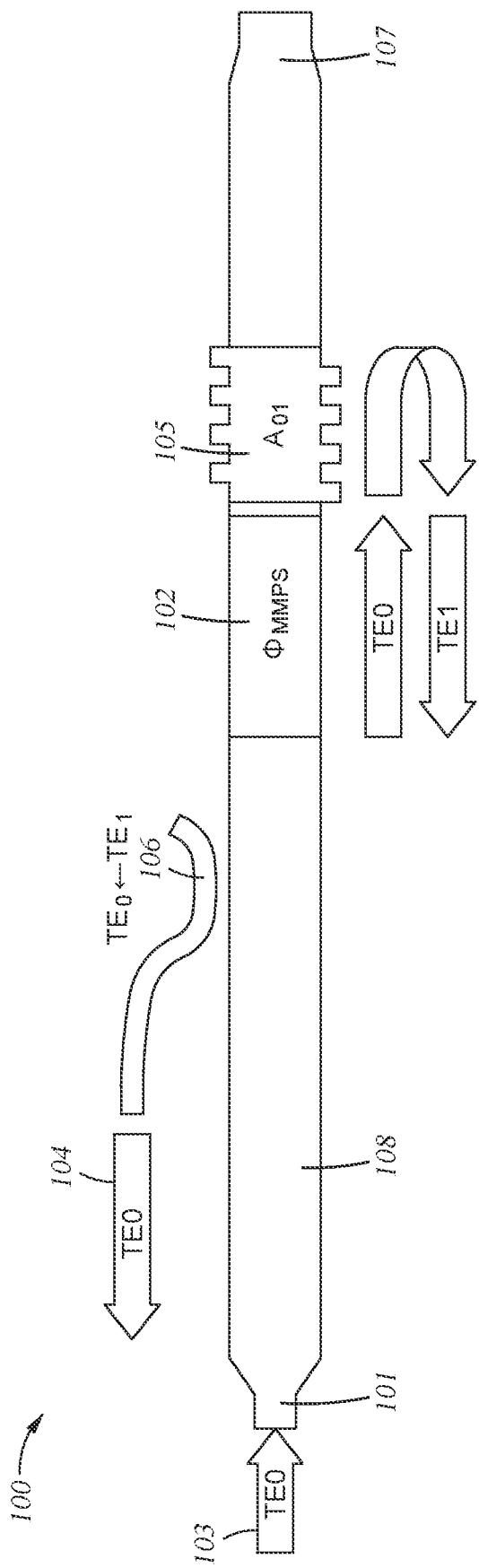
FIG. 1 illustrates a non-resonant grating based multi-mode multi-pass tunable waveguide, according to an embodiment.

One embodiment presented in this disclosure is an optical device having an input portion configured to receive a first optical signal having a first mode; a first two-mode Bragg filter located between a multi-mode multi-pass phase shifter (MMPS) tuner and the end of the waveguide. The first-two-mode Bragg filter is configured to reflect a signal having a mode higher than the mode of the first optical signal.

Another embodiment presented in this disclosure is an optical device having an input portion configured to receive a first optical signal having a first mode; a first two-mode Bragg filter located between a multi-mode multi-pass phase shifter (MMPS) tuner and the end of the waveguide; a second two-mode Bragg filter located between the input portion of the waveguide and the MMPS tuner; and an evanescent coupler. The second two-mode Bragg filter allows the first optical signal to pass from the input portion to the MMPS tuner. The second two-mode Bragg filter is configured to receive a signal from the MMPS tuner and reflect a signal having a mode higher than the mode of the signal reflected by the first two-mode Bragg filter. The first-two-mode Bragg filter is configured to reflect a signal having a mode higher than the mode of the first optical signal.

Another embodiment presented in this disclosure is a method that includes receiving an optical signal at the input of a waveguide; transmitting the received optical signal from the input of the waveguide through a multi-mode multi-pass phase shifter (MMPS) tuner to a first two-mode Bragg filter; reflecting by the first two-mode Bragg filter a signal having a higher order mode than the input optical signal; transmitting the reflected signal through the MMPS tuner; and coupling an output signal to an evanescent coupler.

Another embodiment presented in this disclosure is an optical device including an input portion configured to receive a first optical signal having a first mode, a first two-mode Bragg filter located between a tuner and an end of the optical device. The first two-mode Bragg filter is configured to reflect a signal having a mode higher than the first optical signal and an output that is configured to output an optical signal that has passed through the tuner at least twice.

Example Embodiments

Embodiments herein describe a non-resonant grating based multi-mode multi-pass tunable waveguides. The tunable waveguides include one or more two-mode Bragg gratings which selectively reflect an optical signal depending on its mode. Two-mode Bragg gratings convert the energy of the signal into orthogonal modes of the waveguide. For example, the tunable waveguide may receive an optical signal in a first mode (e.g., traverse electric (TE0) which is then reflected by a two-mode Bragg grating into an optical signal in a second mode (e.g., TE1). In this manner the single signal is imparted on a waveguide such that the influence of multiple signal modes are multiplied by the increased interaction of multiple passes through the same waveguide without the strong wavelength effects of a resonant cavity. The design of the Bragg gratings, included in the embodiments, can encompass one or more channels of the signal across a range of tens of nm and impart a stronger influence than a single pass device, and more flexibility than a resonant device.

Compared to a single pass device, the multiple passes of this device enhance the effects in the waveguide, for greater efficiency.

The embodiments described herein are non-resonant devices. Compared to resonant devices, such as a ring resonator, this device allows for a greater number of signal passes, where the mode of the optical signal is changed each time it is reflected by a two-mode Bragg grating. The increase in passes reduces tuning requirements or eliminates tuning allowing for greater efficiency.

Furthermore, the embodiments described herein are more compact. With no significant bends required, these devices can be implemented in waveguides which use large bend radius, in contrast to prior art solutions which require 180-degree bends.

The embodiments described herein describe waveguide configurations enabling multiple passes of a signal through a waveguide which can be manipulated by thermal, electro-optic, stress-optic, or photonic effects (such as nonlinear gain). These multiple passes enhance the impact of these effects on the signal by approximately the number of passes the light takes through the waveguide. This non-resonant multi-pass behavior can be achieved using grating based coupling to higher order modes (e.g., TE1, TE2, TE3, etc.), since the reflected optical signals are contained in orthogonal modes, and therefore do not intermix with the signal from a prior pass. FIG. 1 illustrates a waveguide device 100 (e.g., an optical device). The waveguide device 100 includes an input portion receiving an input optical signal 103 having a fundamental mode (TE0). The waveguide device 100 includes a end portion 107. The input optical signal 103 enters the waveguide body 101 where it is passed to a multi-mode multi-pass phase shifter (MMPS) tuner 102. The MMPS tuner 102 inhibits coupling of the different modes present within the waveguide. The MMPS tuner 102 allows the different modes to remain orthogonal to each other and share the same physical space.

The MMPS tuner 102 receives the input optical signal 103 and passes the input optical signal 103 to a first two-mode Bragg grating 105. The first two-mode Bragg grating 105 receives the optical signal 103 in the fundamental mode and reflects an optical signal having a mode higher than (TE1) the input optical signal 103 ($\Lambda_{01}$). The MMPS tuner 102 permits both modes to exist within the waveguide without interfering with each other.

A selective evanescent coupler 106 allows the signal, having a mode that matches the mode of the first two-mode Bragg grating 104, to exit the waveguide 101. The selective evanescent coupler does not couple with signals having a mode different from the mode of the signal reflected by the first two-mode Bragg grating 105. The evanescent coupler also alters the mode of the exiting signal to the fundamental mode. In this example, the coupler 106 receives the optical signal in the TE1 mode and converts it back into the fundamental mode TE0.

For signals passing through a Bragg grating, a particular mode is centered around a Bragg wavelength that is defined by: $\lambda=\Lambda_{01}(n_0+n_1)=\Lambda_{12}(n_1+n_2)$. The bandwidth of the grating around this center is determined primarily by the grating strength of the grating perturbation. Entire channels are utilized by a chirp in the grating. Tailoring this chirp function and taking care of the grating strength allows for flexibility to achieve a desired bandwidth.

The Bragg grating can encompass certain design features to improve signal mode selection. The Bragg gratings may be uniformly spaced. The Bragg gratings may also be tilted fiber Bragg gratings. Additionally, the Bragg gratings may be a chirped fiber Bragg grating. A chirp fiber Bragg grating modifies the refractive index of the grating by adding in a linear variation in the grating period. The modification in the grating period allows for linear increase in the spacing between gratings. The Bragg gratings may also be non-symmetric gratings where opposing gratings are offset. The Bragg gratings may also be symmetric gratings where opposing gratings are aligned.

Embodiments of the present invention can also avoid parasitic coupling. Parasitic coupling can be prevented between unwanted modes at the desired wavelength by selection of appropriate wavelengths. For example, periods can be selected for a single waveguide width to form a three-pass design at 1310 nm wavelength. At 1310 nm the signal is passed between the TE0 and TE1 modes, then to the TE2 mode before exiting the waveguide. By maintaining a mean waveguide width of 2.9 um, a grating with 417.1 nm will convert the fundamental mode TE0 to TE1, with the same waveguide width the second grating with a period of 430.3 nm will convert TE1 to TE2. With a perturbation of the grating targeting 30 cm$^{-1}$ between the two modes being coupled the bandwidth of the main peak will be ~7.8 nm, which will not encroach on the nearest adjacent peaks.

The waveguide body is made of silicon or other materials sufficiently suited to allow that transmission of electro-optical signals along the waveguide.

Figure 2:
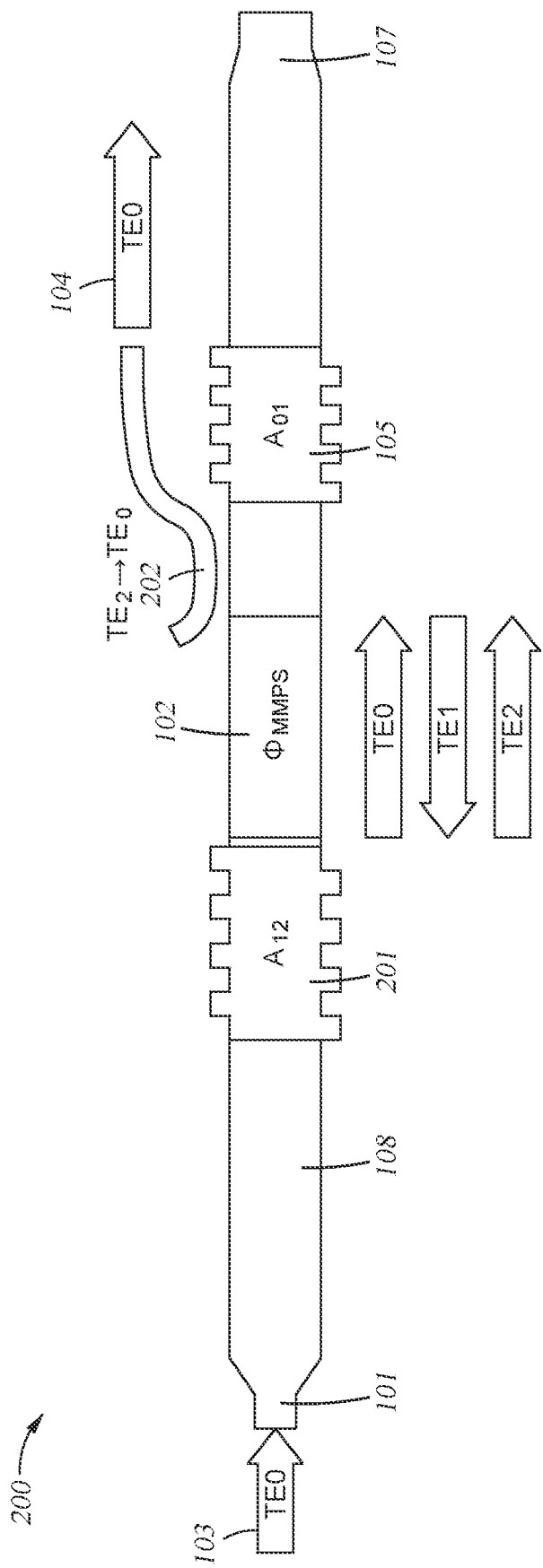
FIG. 2 illustrates a non-resonant grating based multi-mode multi-pass tunable waveguide including two two-mode Bragg gratings, according to an embodiment.

FIG. 2 illustrates a waveguide device 200. The waveguide device 200 includes an input portion receiving an input optical signal 103 having a fundamental mode (TE0). The input optical signal 103 enters the waveguide body 108 where it is passed through a second two-mode Bragg grating 201. The input optical signal 103 is not affected by this initial pass through the second two-mode Bragg grating 201. The input signal 103 passes from the second two-mode Bragg 201 grating to the multi-mode multi-pass phase shifter (MMPS) tuner 102. The MMPS tuner 102 passes the received input signal 103 to the first two-mode Bragg grating 105. In this embodiment, the first two-mode Bragg grating 105 reflects an optical signal having a mode higher than (TE1) the input optical signal 103 ($\Lambda_{01}$) which was in the fundamental mode. The higher mode signal reflected by the first two-mode Bragg grating 105 is passed through the MMPS tuner 102 and is received by the second two-mode Bragg grating 201. This time, rather than permitting the optical signal to pass through, the second two-mode Bragg grating 201 reflects an optical signal having a mode ($\Lambda_{12}$) higher that than the mode of the optical signal reflected by a first two-mode Bragg grating 105 ($\Lambda_{01}$). In this embodiment, the MMPS tuner 102 permits the three modes to exist within the waveguide without interfering with each other. A selective evanescent coupler 202 allows a signal, having a mode that matches the mode of the second two-mode Bragg grating 201, to exit the waveguide 200. The selective evanescent coupler does not couple with signals having a mode different from the mode of the signal reflected by the second two-mode Bragg grating 201. The evanescent coupler also alters the mode of the exiting signal to the fundamental mode.

Figure 3:
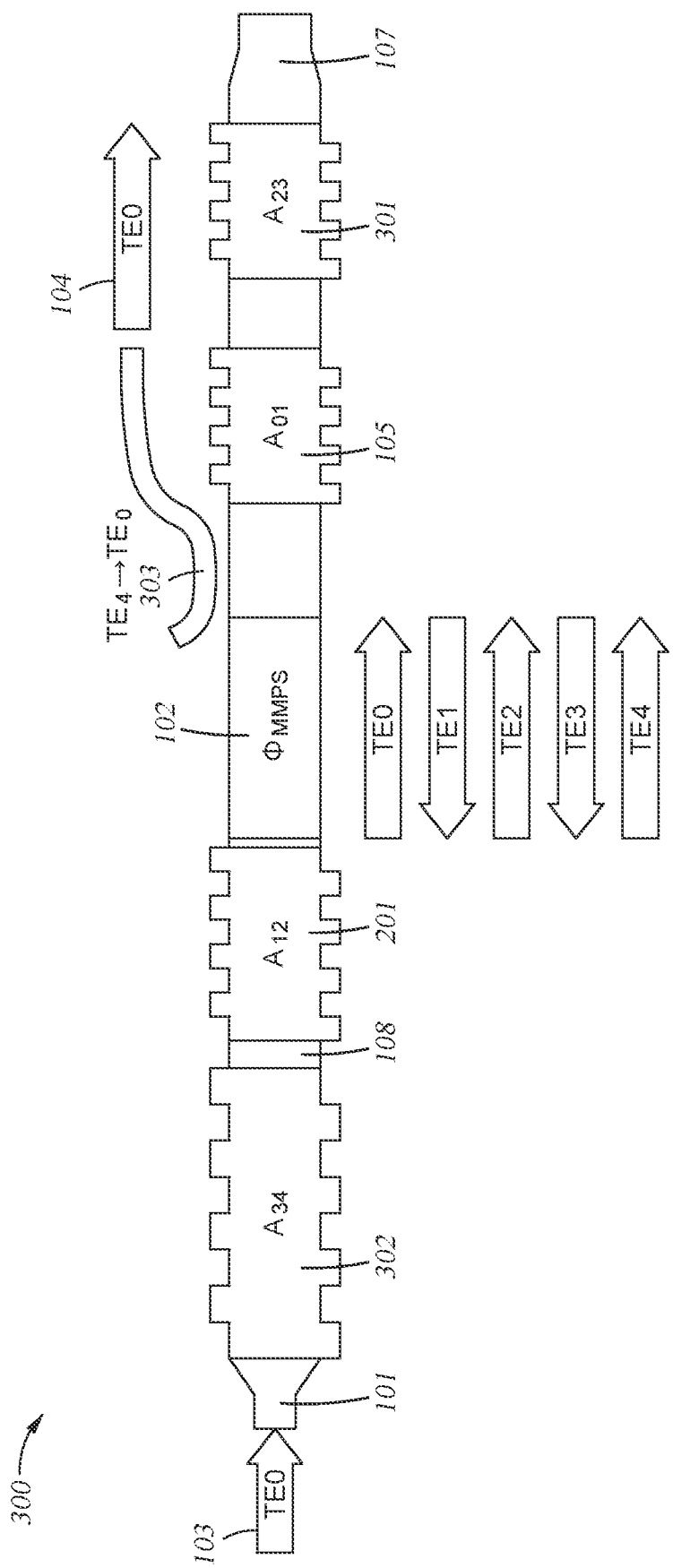
FIG. 3 illustrates a non-resonant grating based multi-mode multi-pass tunable waveguide including a plurality of two-mode Bragg gratings and a multi-mode multi-pass phase tuner, according to an embodiment.

FIG. 3 illustrates a waveguide device 300. The waveguide device 300 includes an input portion receiving an input optical signal having a fundamental mode (TE0). The input optical signal 103 enters the waveguide body 108 where it is passed through a fourth two-mode Bragg grating 302 and the second two-mode Bragg grating 201. Initially, the input signal passes through the fourth two-mode Bragg grating 302 and the second two-mode Bragg grating 201 without either affecting the mode of the input signal. The input signal 103 passes from the second two-mode Bragg 201 grating to the multi-mode multi-pass phase shifter (MMPS) tuner 102. The MMPS tuner 102 passes the received input signal 103 to a first two-mode Bragg grating 105. The first two-mode Bragg grating ($\Lambda_{01}$) 105 reflects a signal having a mode (TE1) higher than the input optical signal 103. The higher mode signal reflected by the first two-mode Bragg grating 105 is passed through the MMPS 102 and is received by the second two-mode Bragg grating ($\Lambda_{12}$) 201. The second two-mode Bragg grating 201 reflects a signal (TE2) having a mode higher than the mode reflected by the first two-mode Bragg grating 105. The signal reflected by the second two-mode Bragg grating passes through the MMPS tuner 102, passes through the first two-mode Bragg grating 105 without being reflected, and is reflected by a third two-mode Bragg grating 301. The third two-mode Bragg grating ($\Lambda_{23}$) 301 reflects a signal (TE3) having a mode higher than the mode of the signal reflected by the second two-mode Bragg grating 201. The signal reflected by the third two-mode Bragg grating 301 passes through the first two-mode Bragg grating 105, the MMPS tuner 102, the second two-mode Bragg grating 201, and is received by a fourth two-mode Bragg grating 302. The fourth two-mode Bragg grating ($\Lambda_{34}$) 302 reflects a signal (TE4) having a mode higher than the mode of the signal reflected by the third two-mode Bragg grating 301. The signal reflected by the fourth two-mode Bragg grating passes through the second two-mode Bragg grating 201, and the MMPS tuner 102. In this embodiment, the MMPS tuner 102 permits the five modes to exist within the waveguide without interfering with each other. A selective evanescent coupler 303 allows the signal, having a mode that matches the mode of the fourth two-mode Bragg grating, to exit the waveguide 300. The selective evanescent coupler 303 does not couple with signals having a mode different from the mode of the signal reflected by the fourth two-mode Bragg grating 302. The evanescent coupler 303 also alters the mode of the exiting signal to the fundamental mode.

Figure 4:
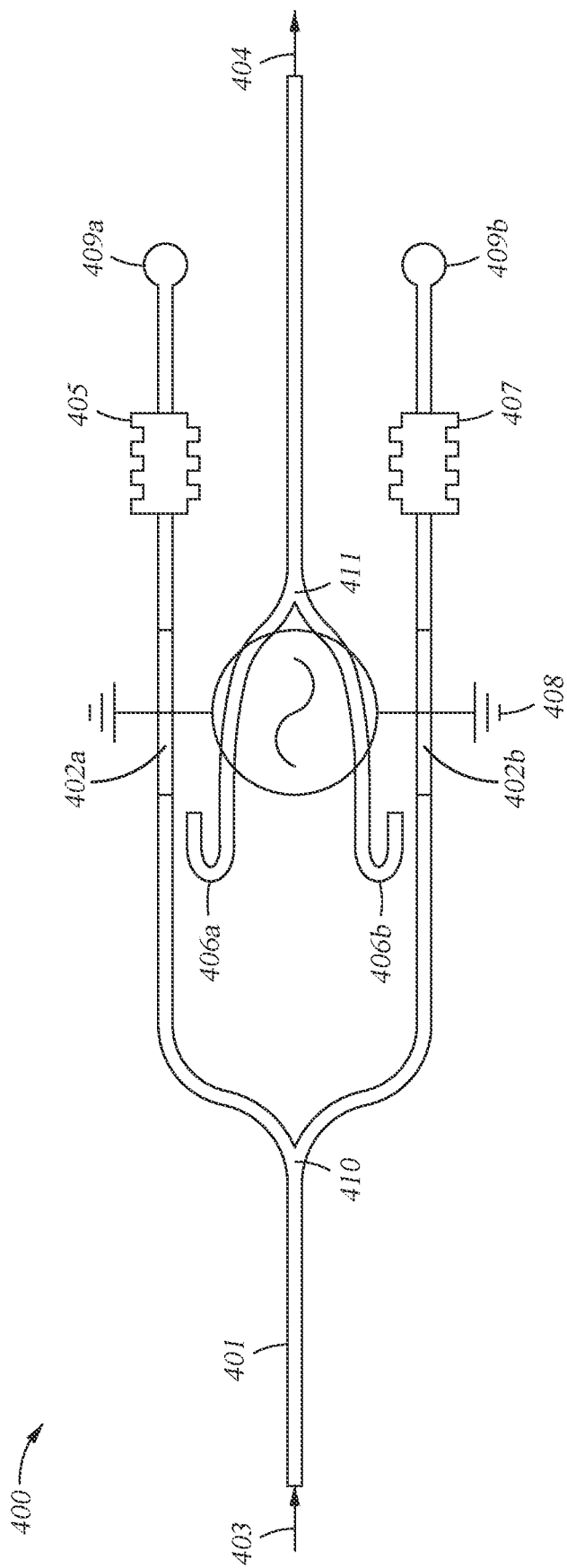
FIG. 4 illustrates an interferometer with a phase tuner that includes two-mode Bragg gratings, according to an embodiment.

FIG. 4 illustrates an interferometer 400 that includes multiple electro-optic multi-mode multi-pass phase (EOMMPS) tuners 402a, 402b. The interferometer 400 (e.g., a Mach-Zehnder interferometer (MZI) or a Mach-Zehnder modulator (MZM)) includes an input portion receiving an input optical signal 403 having a fundamental mode (TE0). The input optical signal 403 enters the waveguide body 401 where it is passed to a Y-splitter 410. The Y-splitter 410 passes a first signal through a first EOMMPS tuner 402a. The first signal passes through the first EOMMPS tuner 402a and is received by a first two-mode Bragg grating 405. The first two-mode Bragg grating 405 reflects a signal (TE1) having a mode higher than the mode of the input signal 403. The EOMMPS tuner 402a can tune the signal by the application of electro-optic modulation 408.

The Y-splitter 410 also passes a second signal through a second EOMMPS tuner 402b. The second signal passes through the second EOMMPS tuner 402b and is received by a second two-mode Bragg grating 407. The second two-mode Bragg grating 407 reflects a signal (TE2) having a mode higher than the mode of the signal reflected by the first two-mode Bragg grating 405. The EOMMPS 402b can tune the signal by the application of electro-optic modulation 408.

A first selective evanescent coupler 406a allows a signal, having a mode that matches the mode of the first two-mode Bragg grating 405, to exit the interferometer 400. The first selective evanescent coupler does not couple with signals having a mode different from the mode of the signal reflected by the first two-mode Bragg grating 405. A second selective evanescent coupler 406b allows a signal, having a mode that matches the mode of the second two-mode Bragg grating 407, to exit the interferometer 400. The selective evanescent coupler does not couple with signals having a mode different from the mode of the signal reflected by the second two-mode Bragg grating 407. The signals captured by the first and second selective evanescent couplers 406a, 406b merge at a Y-coupler 411 of the selective evanescent coupler, are converted by the selective evanescent coupler to a signal having a fundamental mode, and exit as an output signal 404. The interferometer 400 waveguide includes terminations 409a and 409b.

As shown, the EOMMPS tuner 402a, the two-mode Bragg grating 405, and the coupler 406a have a similar structure as the waveguide device 100 in FIG. 1. Moreover, the EOMMPS tuner 402b, the two-mode Bragg grating 407 and the coupler 406b have a similar structure as the waveguide device 100 in FIG. 1. Thus, the function of these components can include any of the description in FIG. 1. In this example, FIG. 4 illustrates using two copies of the waveguide device 100 in FIG. 1 in one example implementation of the interferometer 400.

Figure 5:
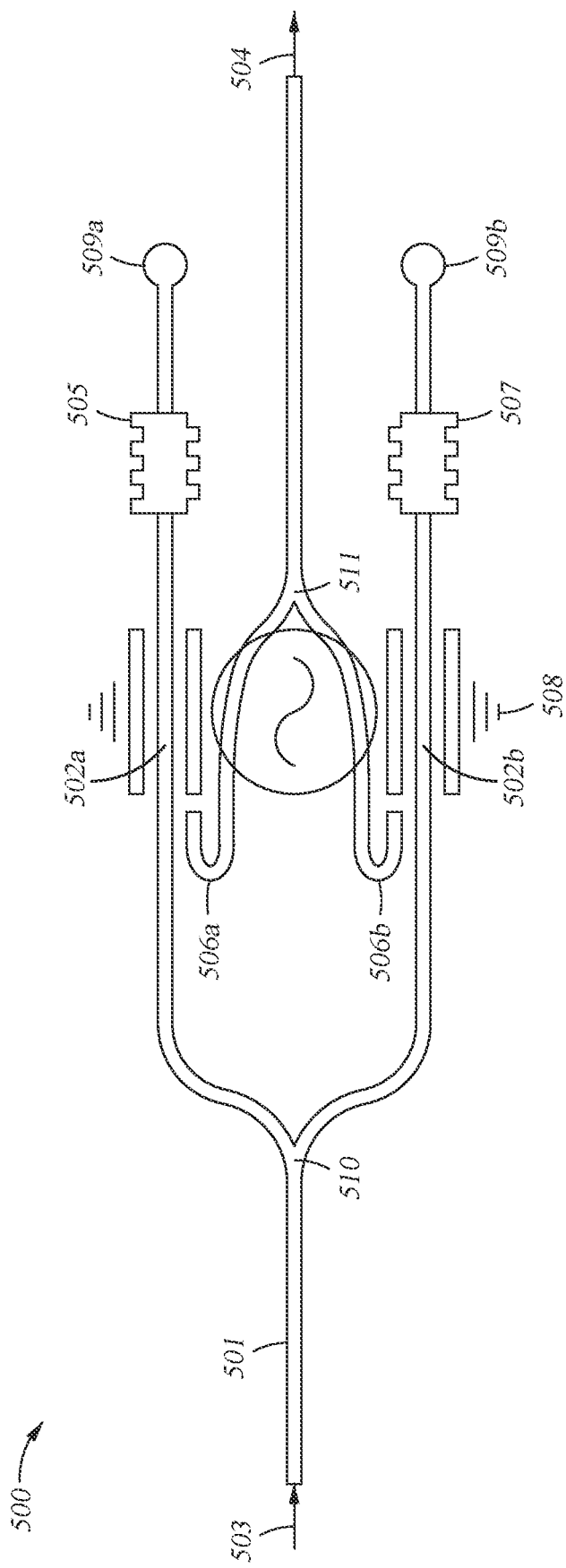
FIG. 5 illustrates an interferometer with a phase tuner that includes two-mode Bragg gratings, according to an embodiment.

FIG. 5 illustrates an interferometer 500 having multiple thermal modulation multi-mode multi-pass phase shifter (TMMMPS) tuners. The interferometer 500 includes an input portion receiving an input optical signal 503 having a fundamental mode. The input optical signal 503 enters the waveguide body 501 where it is passed to a Y-splitter 510. The Y-splitter 510 passes a first signal through a first TMMMPS tuner 502a. The first signal passes through the first TMMMPS tuner 502a and is received by a first two-mode Bragg grating 505. The first two-mode Bragg grating 505 reflects a signal having a mode higher than the mode of the input signal 503. The TMMMPS can tune the signal by the application of thermal modulation 508.

The Y-splitter 510 also passes a second signal through a second TMMMPS tuner 502b. The second signal passes through the second TMMMPS tuner 502b and is received by a second two-mode Bragg grating 507. The second two-mode Bragg grating 507 reflects a signal having a mode higher than the mode of the signal reflected by the first two-mode Bragg grating 505. The TMMMPS can tune the signal by the application of thermal modulation 508.

A first selective evanescent coupler 506a allows a signal, having a mode that matches the mode of the signal reflected by the first two-mode Bragg grating 505, to exit the interferometer 500. The first selective evanescent coupler does not couple with signals having a mode different from the mode of the signal reflected by the first two-mode Bragg grating 505. A second selective evanescent coupler 506b allows a signal, having a mode that matches the mode of the second two-mode Bragg grating 507, to exit the interferometer 500. The selective evanescent coupler does not couple with signals having a mode different from the mode of the signal reflected by the second two-mode Bragg grating 507. The signals captured by the first and second selective evanescent couplers 506a, 506b merge at a Y-coupler 511 of the selective evanescent coupler, are converted by the selective evanescent coupler to a signal having a fundamental mode, and exit as an output signal 504. The interferometer 500 waveguide includes terminations 509a and 509b.

As shown, the TMMPS tuner 502a, the two-mode Bragg grating 505, and the selective evanescent coupler 506a, have a similar structure as the waveguide device 100 in FIG. 1. Moreover, the TMMPS tuners 502b, the two-mode Bragg grating 507 and the selective evanescent couplers 406b have a similar structure as the waveguide device 100 in FIG. 1. Thus, the function of these components can include any of the description in FIG. 1. In this example, FIG. 5 illustrates using two copies of the waveguide device 100 in FIG. 1 in one example implementation of the interferometer 500.

Figure 6:
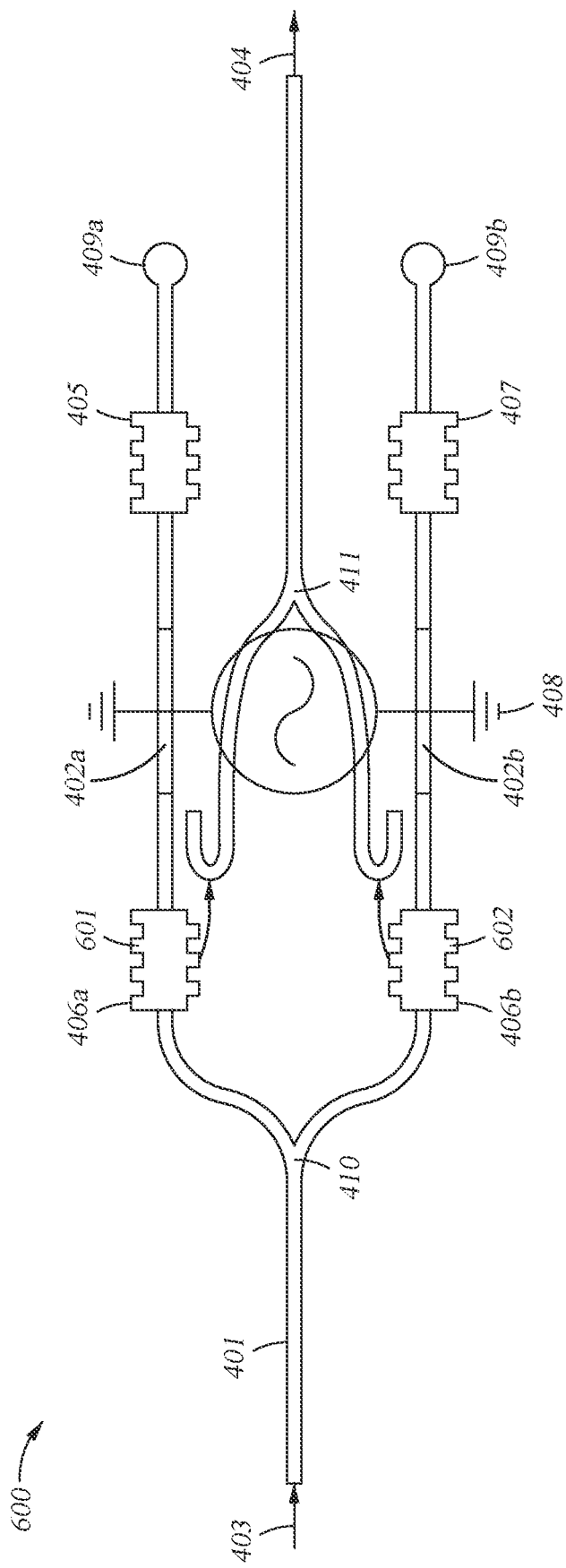
FIG. 6 illustrates an interferometer with a phase tuner that includes two-mode Bragg gratings, according to an embodiment.

FIG. 6 illustrates an interferometer 600 that includes multiple EOMMPS tuners 402a, 402b. The interferometer 600 (e.g., a Mach-Zehnder interferometer (MZI) or a Mach-Zehnder Modulator (MZM)) includes an input portion receiving an input optical signal 403 having a fundamental mode. The input optical signal 403 enters the waveguide body 401 where it is passed to a Y-splitter 410. The first signal passes through a third two-mode Bragg grating 601, passes through the EOMMPS tuner 402a, and is received by a first two-mode Bragg grating 405. The first signal is not affected by this initial pass through the third two-mode Bragg grating 601. The first two-mode Bragg grating 405 reflects a signal having a mode higher than the mode of the input signal 403. The reflecting signal passes through the EOMMPS tuner 402a and is received by a third two-mode Bragg grating 601. The third two-mode Bragg grating reflects a signal having a mode higher than the mode of a second two-mode Bragg grating 602. With each pass through the EOMMPS tuner, the EOMMPS tuner 402a can tune the signal by the application of electro-optic modulation 408.

The Y-splitter 410 also passes a second signal through an EOMMPS tuner 402b. The second signal passes through the fourth two-mode Bragg grating 602, passes through the EOMMPS tuner 402b, and is received by the second two-mode Bragg grating 407. The second signal is not affected by this initial pass through the fourth two-mode Bragg grating 602. The second two-mode Bragg grating 407 reflects a signal having a mode higher than the mode of the signal reflected by the first two-mode Bragg grating 405. The signal reflected by the second two-mode Bragg filter passes through the EOMMPS 402b, and is received by the fourth two-mode Bragg filter 602. The fourth two-mode Bragg filter 602 reflects a signal having a mode higher than the mode of the third two-mode Bragg filter 601. With each pass through the EOMMPS tuner 402a, the EOMMPS tuner 402a can tune the signal by the application of electro-optic modulation 408.

A first selective evanescent coupler 406a allows a signal, having a mode that matches the mode of the third two-mode Bragg grating 601, to exit the interferometer 600 waveguide. The first selective evanescent coupler 406a does not couple with signals having a mode different from the mode of the signal reflected by the third two-mode Bragg grating 601. A second selective evanescent coupler 406b allows a signal, having a mode that matches the mode of the fourth two-mode Bragg grating 602, to exit the interferometer 600 waveguide. The second selective evanescent coupler 406b does not couple with signals having a mode different from the mode of the signal reflected by the fourth two-mode Bragg grating 602. The signals captured by the first and second selective evanescent couplers 506a, 506b merge at a Y-coupler 411 of the selective evanescent coupler, are converted by the selective evanescent coupler to a signal having a fundamental mode, and exit as an output signal 404. The interferometer 600 includes terminations 409a and 409b.

Figure 7:
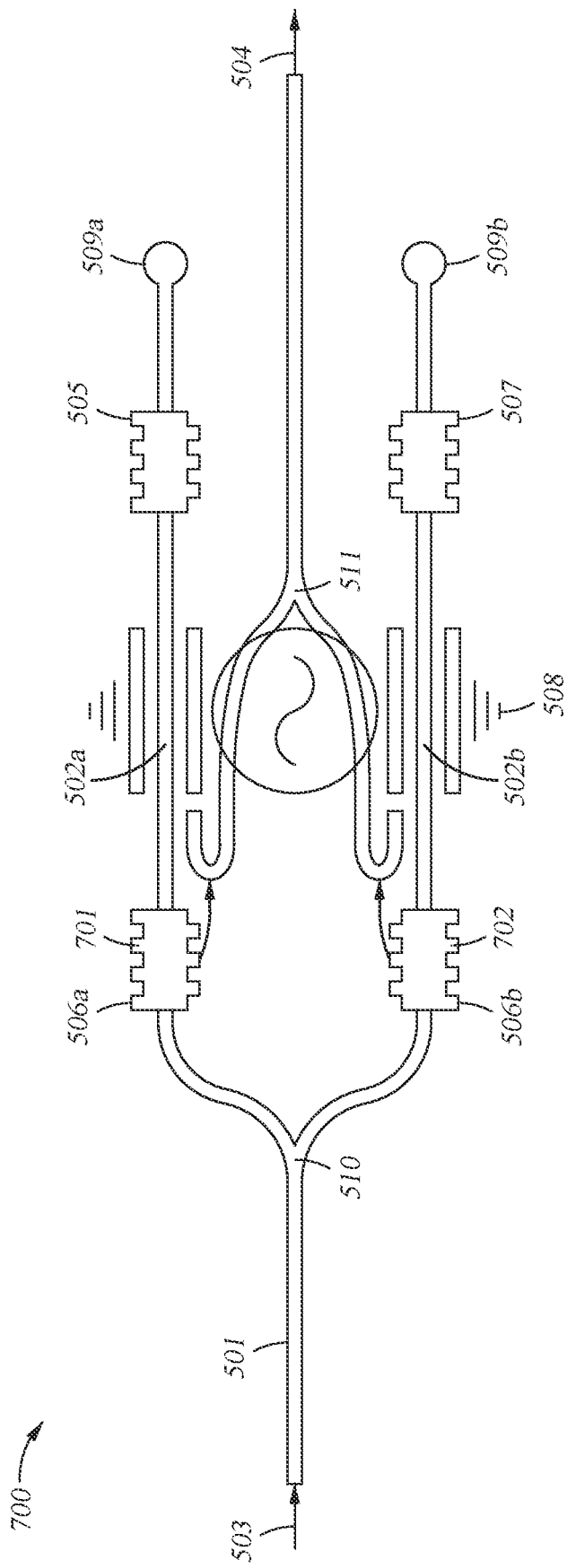
FIG. 7 illustrates an interferometer with a phase tuner that includes two-mode Bragg gratings, according to an embodiment.

FIG. 7 illustrates an interferometer 700 that includes multiple thermal modulation multi-mode multi-pass phase shifter (TMMMPS) tuners. The interferometer 700 includes an input portion receiving an input optical signal 503 having a fundamental mode. The input optical signal 503 enters the waveguide body 501 where it is passed to a Y-splitter 510. The first signal passes through a third two-mode Bragg grating 701, passes through the first TMMMPS tuner 502a, and is received by a first two-mode Bragg grating 505. The first signal is not affected by this initial pass through the third two-mode Bragg grating 701. The first two-mode Bragg grating 505 reflects a signal having a mode higher than the mode of the input signal 503. The reflecting signal passes through the first TMMMPS tuner and is received by a third two-mode Bragg grating 701. The third two-mode Bragg grating reflects a signal having a mode higher than the second two-mode Bragg grating 507. With each pass through the first TMMMPS tuner 502a, the first TMMMPS tuner 502a can tune the signal by the application of thermal modulation 508.

The Y-splitter 510 also passes a second signal through a fourth two-mode Bragg grating 702, through a second TMMMPS tuner 502b, and is received by a second two-mode Bragg grating 507. The second signal is not affected by this initial pass through the fourth two-mode Bragg grating 702. The second two-mode Bragg grating 507 reflects a signal having a mode higher than the mode of the signal reflected by the first two-mode Bragg grating 505. The signal reflected by the second two-mode Bragg filter passes through the second TMMMPS tuner 502b, and is received by a fourth two-mode Bragg filter 702. The fourth two-mode Bragg filter 702 reflects a signal having a mode greater than the mode of the third two-mode Bragg filter 701. With each pass through the second TMMMPS 502b, the second TMMMPS tuner 502b can tune the signal by the application of thermal modulation 508.

A first selective evanescent coupler 506a allows a signal, having a mode that matches the mode of the third two-mode Bragg grating 701, to exit the interferometer 700. The first selective evanescent coupler does not couple with signals having a mode different from the mode of the signal reflected by the third two-mode Bragg grating 701. A second selective evanescent coupler 506b allows a signal, having a mode that matches the mode of the fourth two-mode Bragg grating 702, to exit the interferometer 700 waveguide. The second selective evanescent coupler does not couple with signals having a mode different from the mode of the signal reflected by the fourth two-mode Bragg grating 702. The signals captured by the first and second selective evanescent couplers 506a, 506b merge at a Y-coupler 510 of the selective evanescent coupler, are converted by the selective evanescent coupler to a signal having a fundamental mode, and exit as an output signal 504. The interferometer 700 waveguide includes terminations 509a and 509b.

Figure 8:
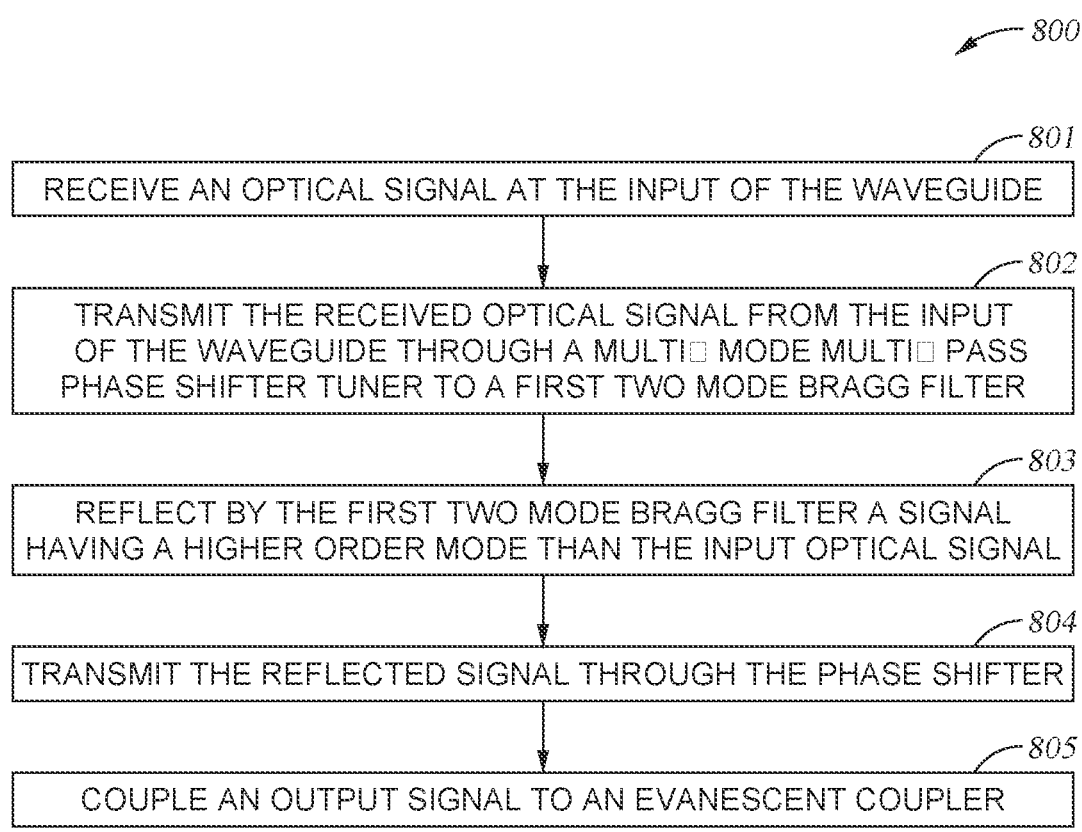
FIG. 8 illustrates a method of operation for an embodiment of the invention.

As shown, the TMMPS tuner 502a, the two-mode Bragg grating 505, the two-mode Bragg grating 701, and the selective evanescent coupler 506a, have a similar structure as the waveguide device 300 in FIG. 3. Moreover, the TMMPS tuner 502b, the two-mode Bragg grating 507, the two-mode Bragg grating 702, and the selective evanescent couplers 506b have a similar structure as the waveguide device 300 in FIG. 3. Thus, the function of these components can include any of the description in FIG. 3. In this example, FIG. 8 illustrates a method of operation of the embodiments of the disclosed invention. At block 801, an input portion of a waveguide receives an optical signal. At block 802, the received optical signal is transmitted from the input of the waveguide through a multi-mode multi-pass phase shifter (MMPS) tuner to a first two mode Bragg filter. At block 803, the receiving optical signal is reflected by the first two mode Bragg filter a signal, the reflected signal having a higher order mode than the input optical signal. At block 804, the reflected signal is transmitted through the MMPS tuner. At block 805, an output signal is coupled to an evanescent coupler where the output signal has the same mode as the signal reflected by the first two-mode Bragg grating. The method 800 can be expanded to include additional two-mode Bragg gratings. Each of the additional two-mode Bragg gratings can be tuned to reflect signals having different modes. As set forth in the preceding paragraphs, the method of FIG. 8 can be expanded to reflect the various arrangements of two-mode Bragg gratings, MMPS tuners, and selective evanescent couplers as detailed in FIGS. 1-7.

The steps of the method include receive an optical signal at the input of the waveguide, transmit the received optical signal from the input of the waveguide through a multi-mode multi-pass phase shifter to a first two-mode Bragg filter, reflect by the first two-mode Bragg filter a signal having a higher order mode than the input optical signal, transmit the reflected signal through the phase shifter, and couple an output signal to an evanescent coupler.

Applications of the embodiments described herein can be in amplitude, phase, and frequency manipulation. Examples may include high speed modulation, phase shifting by thermal tuners such as a variable optical attenuator (VOA), intra-cavity phase shifting in a laser, electro optic attenuation or amplification by multiple passes through a lossy or gain waveguide, etc. This device is also wavelength selective, so filters can be made with it, for applications, such as wavelength division multiplexing or as an element in a wavelength selective mirror or cavity.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An optical device comprising:
   an input portion configured to receive a first optical signal having a first mode; and
   a first two-mode Bragg filter located between a multi-mode multi-pass phase shifter (MMPS) tuner and an end of the optical device, wherein the first two-mode Bragg filter is configured to reflect a signal having a mode higher than the first optical signal.

2. The optical device of claim 1, wherein a second two-mode Bragg filter is between the input portion and the MMPS tuner, and the second two-mode Bragg filter is configured to receive the first optical signal from the input portion, pass the received signal to the MMPS tuner, receive the signal reflected by the first two-mode Bragg filter, and reflect a second optical signal having a higher order mode than the signal reflected by the first two-mode Bragg filter.

3. The optical device of claim 1, wherein the first mode is a fundamental mode.

4. The optical device of claim 2, further comprising a third two-mode Bragg filter, wherein the third two-mode Bragg filter is between the first two-mode Bragg filter and the end of the optical device.

5. The optical device of claim 4, further comprising a fourth two-mode Bragg filter disposed between the input portion of the optical device and the second two-mode Bragg filter.

6. The optical device of claim 2, wherein an output optical signal exits the optical device between the MMPS tuner and the second two-mode Bragg filter.

7. The optical device of claim 5, wherein an evanescent coupler is disposed between the MMPS tuner and the second two-mode Bragg filter for receiving an output optical signal, wherein the evanescent coupler changes the mode of the output optical signal to the first mode.

8. A method comprising:
   receiving an optical signal at an input of a waveguide,
   transmitting the received optical signal from the input of the waveguide through a multi-mode multi-pass phase shifter (MMPS) tuner to a first two-mode Bragg filter;
   reflecting by the first two-mode Bragg filter a signal having a higher order mode than the input optical signal;
   transmitting the reflected signal through the MMPS tuner; and
   coupling, after passing through the MMPS tuner at least twice, an output signal to an evanescent coupler.

9. The method of claim 8, wherein the first mode is a fundamental mode.

10. The method of claim 8, further comprising:
    transmitting the received optical signal from the input to a second two-mode Bragg filter;
    passing the received signal to the MMPS tuner;
    receiving by the second two-mode Bragg filter the signal reflected by the first two-mode Bragg filter; and
    reflecting by the second two-mode Bragg filter a second optical signal having a higher order mode than the signal reflected by the first two-mode Bragg filter, wherein the second two-mode Bragg filter is positioned between the input and the MMPS tuner.

11. The method of claim 10 comprising transmitting the received optical signal to a third two-mode Bragg filter wherein the third two-mode Bragg filter is positioned between the first two-mode Bragg filter and an end of the waveguide, wherein the third two-mode Bragg filter reflects a signal have a mode higher than that mode of the second two-mode Bragg filter.

12. The method of claim 11, further comprising: transmitting the received optical signal through a fourth two-mode Bragg filter wherein the fourth two-mode Bragg filter is positioned between the input and the second two-mode Bragg filter, and wherein the fourth two-mode Bragg filter reflects a signal have a mode higher than the mode of the third two-mode Bragg filter.

13. The method of claim 10, wherein an output optical signal exits the waveguide between the MMPS tuner and the second two-mode Bragg filter.

14. The method of claim 12, wherein an evanescent coupler is disposed between the MMPS tuner and the second two-mode Bragg filter for receiving an output optical signal, wherein the evanescent coupler changes the mode of the output signal to the first mode.

15. An optical device comprising:
   an input portion configured to receive a first optical signal having a first mode;
   a first two-mode Bragg filter located between a tuner and an end of the optical device, wherein the first two-mode Bragg filter is configured to reflect a signal having a mode higher than the first optical signal; and
   an output configured to output an optical signal that has passed through the tuner at least twice.

16. The optical device of claim 15, wherein a second two-mode Bragg filter is between the input portion and the tuner, and the second two-mode Bragg filter is configured to receive the first optical signal from the input portion, pass the received signal to the tuner, receive the signal reflected by the first two-mode Bragg filter, and reflect a second optical signal having a higher order mode than the signal reflected by the first two-mode Bragg filter.

17. The optical device of claim 15, wherein the first mode is a fundamental mode.

18. The optical device of claim 15, further comprising a third two-mode Bragg filter, wherein the third two-mode Bragg filter is between the first two-mode Bragg filter and the end of the optical device.

19. The optical device of claim 16, further comprising a fourth two-mode Bragg filter disposed between the input portion of the optical device and the second two-mode Bragg filter.

20. The optical device of claim 16, wherein an output optical signal exits the optical device between the tuner and the second two-mode Bragg filter.

* * * * *